US012623239B2

(12) United States Patent
Fang

(10) Patent No.: US 12,623,239 B2
(45) Date of Patent: May 12, 2026

(54) LIQUID DISPENSER

(71) Applicant: Aptar Radolfzell GmbH, Radolfzell (DE)

(72) Inventor: Shuting Fang, Passau (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 162 days.

(21) Appl. No.: 18/693,615

(22) PCT Filed: Oct. 13, 2022

(86) PCT No.: PCT/EP2022/078577
§ 371 (c)(1),
(2) Date: Mar. 20, 2024

(87) PCT Pub. No.: WO2023/062160
PCT Pub. Date: Apr. 20, 2023

(65) Prior Publication Data

US 2024/0382991 A1 Nov. 21, 2024

(30) Foreign Application Priority Data

Oct. 15, 2021 (EP) .................................... 21202966

(51) Int. Cl.
*B05B 11/10* (2023.01)

(52) U.S. Cl.
CPC ........ *B05B 11/1059* (2023.01); *B05B 11/104* (2023.01); *B05B 11/1046* (2023.01); *B05B 11/1056* (2023.01)

(58) Field of Classification Search
CPC ............... B05B 11/1059; B05B 11/104; B05B 11/1046; B05B 11/1056; B05B 11/0038;
(Continued)

(56) References Cited

U.S. PATENT DOCUMENTS 6,244,469 B1 6/2001 Knickerbocker
8,857,668 B2 10/2014 Auerbach et al.
(Continued)

FOREIGN PATENT DOCUMENTS

EP 2492019 A1 8/2012
WO 2005044354 A1 5/2005
(Continued)

OTHER PUBLICATIONS

International Search Report, with English translation, issued in corresponding International Application No. PCT/EP2022/078577, date of mailing Feb. 21, 2023 (6 pages).
(Continued)

*Primary Examiner* — Vishal Pancholi
(74) *Attorney, Agent, or Firm* — FLYNN THIEL, P.C.

(57) ABSTRACT

A liquid dispenser has a liquid reservoir for storing liquid prior to discharge and a nozzle unit through which liquid is discharged in a discharge direction. The liquid dispenser also has an actuating handle actuable in a direction that deviates from the discharge direction in order to convey liquid from the liquid reservoir to the nozzle unit. The liquid dispenser has an inner housing to which the actuating handle is pivotably articulated, and an outer housing displaceable in a translational manner relative to the inner housing between a first end position and a second end position. The actuating handle and the outer housing have cooperating locking positions which prevent actuation of the actuating handle in the first end position and which allow actuation of the actuating handle in the second end position.

24 Claims, 6 Drawing Sheets

(58) Field of Classification Search
CPC ............... B05B 11/0056; B05B 11/028; B05B 11/1004; B05B 11/1011; B05B 11/1015; B05B 11/1049; B05B 11/1074; A61M 15/00; A61M 15/0051; A61M 15/025; A61M 11/003
See application file for complete search history.

(56) References Cited

U.S. PATENT DOCUMENTS

| | | | | |
|---|---|---|---|---|
| 10,960,788 | B2 | 3/2021 | Andres et al. | |
| 2002/0008122 | A1 | 1/2002 | Ritsche et al. | |
| 2007/0095853 | A1* | 5/2007 | Bonney | A61M 11/001 222/21 |
| 2010/0155431 | A1* | 6/2010 | Bartolucci | B05B 11/028 222/389 |
| 2014/0290652 | A1* | 10/2014 | Davies | B05B 11/1052 128/203.12 |

FOREIGN PATENT DOCUMENTS

| | | | |
|---|---|---|---|
| WO | 2017191025 | A1 | 11/2017 |
| WO | 2023062160 | A1 | 4/2023 |

OTHER PUBLICATIONS

Written Opinion of International Searching Authority, issued in corresponding International Application No. PCT/EP2022/078577, date of mailing Feb. 21, 2023 (5 pages).

* cited by examiner

LIQUID DISPENSER

FIELD OF APPLICATION AND PRIOR ART

The invention relates to liquid dispensers for discharging liquids. The invention primarily relates to liquid dispensers which are carried by the user in everyday life and which contain a maximum liquid volume of preferably 200 ml or less in a liquid reservoir.

In particular, the invention relates to the field of liquid dispensers for use with a liquid containing nicotine or even cannabis. Such dispensers are used as a substitute for tobacco products and the like.

A convenient and simple means of actuation is very important in liquid dispensers and, in particular, in the aforementioned dispensers for liquid containing nicotine or even cannabis. This makes it possible to remove such a liquid dispenser both casually, for example from a trouser pocket, and to take liquid orally by actuation.

However, in such a liquid dispenser it is also naturally desirable that there is no inadvertent discharge, for example in the trouser pocket.

SUMMARY

It is one object of the invention to provide a liquid dispenser of the type in question which provides a convenient means of operation and security relative to the inadvertent discharge of liquid.

A liquid dispenser is proposed according to a first aspect of the invention, said liquid dispenser having a liquid reservoir for storing the liquid prior to discharge and a nozzle unit through which liquid can be discharged. In order to discharge liquid, it is possible to provide a pump device which can be actuated by means of an actuating handle and by means of which liquid is conveyed from the unpressurized liquid reservoir. Alternatively, the actuating handle can also be operatively connected to an outlet valve so that, by actuating the actuating handle, the outlet valve is opened and liquid is conveyed to the nozzle unit from a liquid reservoir which is configured in this case as a pressure accumulator. In the simplest case, the nozzle unit is formed by a single discharge opening. Preferably, however, the nozzle is configured to generate a spray, for example through a discharge opening which is connected upstream of a swirl chamber or through a nozzle plate with a plurality of nozzle openings which generates parallel, diverging or converging individual jets. In particular, the nozzle openings generate individual jets which are sufficiently fine in order to break up into individual droplets independently of the influence of air, by means of Rayleigh instability.

According to the first aspect of the invention, it is provided that the liquid dispenser has an inner housing. This inner housing is a housing part to which the actuating handle is attached in a pivotable manner, in particular by means of pivot pins on one of the parts, preferably on the actuating handle, and corresponding receiving holes on the other part, preferably the inner housing. Moreover, the inner housing preferably has a through-passage which serves for indirectly receiving the aforementioned nozzle and, in particular, the aforementioned nozzle plate. In a preferred embodiment, the inner housing is not able to be identified from the outside, or only to a small extent, since it is surrounded by other housing parts. As a result, advantageously it can have a shape which is designed purely from a technical point of view.

An outer housing is provided in addition to the inner housing. This outer housing preferably forms together with the actuating handle an internal space which is surrounded over the periphery and in which the inner housing is arranged. Preferably, the actuating handle and the outer housing form the predominant part of an outer contour of the liquid dispenser. The outer housing can be displaced in a translational manner relative to the inner housing between a first end position and a second end position and thus also relative to the actuating handle attached thereto.

A separation of the outer housing and the inner housing is not intended during operation by the end customer. At least the sub-elements which provide the guidance of the outer housing and inner housing are generally not dismantled by the user. In particular, preferably the outer housing and the inner housing or the sub-elements of the outer housing and the inner housing forming the guidance are undetachably connected to one another.

The displaceability of the outer housing and inner housing is used in order to be able to achieve a locked state and a released state of the liquid dispenser. To this end, the actuating handle and the outer housing have cooperating locking portions. The locking portions prevent an actuation of the actuating handle in the first end position of the outer housing relative to the inner housing. However, the pivoting actuation of the actuating handle is allowed in the second end position.

The locking portions are preferably structures which are configured in one piece with adjacent walls of the outer housing or the inner housing, in particular elevations or depressions which collide in the locked state during a pivoting movement of the actuating handle and thereby prevent the discharge. In the locked state, the actuating handle cannot be pivoted sufficiently far to actuate a pump device or to open an outlet valve. In the released state, these locking structures are in an offset position, corresponding to the translational displacement of the inner housing and outer housing, in which they allow the pivoting of the actuating handle.

The requirement of being able to bring about initially a translational displacement of the inner housing relative to the outer housing, starting from the locked state, represents an effective protection from inadvertent actuation. The user can carry the liquid dispenser in the locked state in a pocket and, when pulling it out, can transfer it into the released state with one hand movement.

However, it is advantageous if the construction ensures that the translational displacement does not take place inadvertently. In order to achieve this, the inner housing and the outer housing can be guided on one another with friction.

On the other hand, however, it is advantageous if the liquid dispenser has a blocking device, the displaceability of the outer housing relative to the inner housing being able to be blocked thereby. During the operation of the liquid dispenser, such a blocking device makes it necessary first to carry out a separate handling step which then only afterwards allows the translational displacement of the inner housing and outer housing.

A preferred possibility is that a resiliently deflectable blocking body is provided on the inner housing or on the outer housing, said blocking body being arranged in a position which is not deflected or only slightly deflected in a blocking recess of the outer housing or the inner housing, and thereby bringing about the blocking. This blocking body is preferably able to be deflected by means of at least one release button, such that it is pushed out of the blocking recess and then allows the translational displacement. The blocking body and the release button can both be provided on the outer housing, while the blocking recess is provided on the inner body. It is preferred, however, if the blocking recess and the release button are provided on the outer body, while the blocking body is provided on the inner body and can be resiliently deflected relative to surrounding wall parts of the inner body.

It is further preferred if the release button is provided opposite the actuating handle on the dispenser. The liquid dispenser can then be gripped so that the thumb is positioned on the actuating button and one of the other fingers is used for pushing in the release button. Alternatively, the thumb can be positioned for pushing in the release button, while the other fingers are positioned on the actuating handle.

A blocking recess on the outer housing can fulfill a dual function if it forms a through-passage through which an indicator surface of the inner housing can be seen from the outside when the inner housing and the outer housing are in the first or the second end position. The first and second end positions can be easily detected through the through-passage when a red partial surface of the inner body, for example, can be identified in the first end position and/or a green partial surface, for example, can be identified in the second end position. Such a design with an indicator surface and through-passage, however, is also possible detached from the blocking device and the blocking recess thereof.

If the nozzle opening or the nozzle plate is configured on the inner body or is stationary relative thereto, it is moved in a translational manner therewith when the inner body is displaced relative to the outer body between the locked and the released state. This makes it possible to move the nozzle into a position which is protected by the outer housing when the liquid dispenser is in the locked state.

In particular, it can be provided that the nozzle unit and/or a discharge nozzle surrounding the nozzle unit is arranged such that the nozzle unit and/or the discharge nozzle is arranged inside the outer housing in the first end position and thus in the locked dispenser state, and is displaced outwardly through an opening of the outer housing in the second end position.

The following designs are regarded as particularly expedient relative to the locking portions which have been already described above and which in the locked state limit the pivotability of the actuating handle.

In one design, the outer housing has at least one locking contour extending inwardly, or preferably outwardly, and preferably in the manner of a pin or two pins opposing one another. The actuating handle correspondingly has at least one locking edge facing in the direction of the at least one locking contour, a free region being arranged adjacent thereto. If the outer housing and the inner housing are in the first end position, and thus in the locked state, the locking edge collides with the locking contour. In the second end position, however, the locking contours, in particular the pins, are offset so that when the actuating handle is actuated they pass into the free region and no longer oppose the displacement required for the discharge of liquid.

In a further design, it is provided that the outer housing has a through-passage through which the actuating handle extends outwardly from an inner region of the outer housing. With such a structure it is possible to adapt the actuating handle to the through-passage such that in the first end position a distal end of the actuating handle strikes against an edge region of the through-passage when actuated, so that a discharge of liquid is prevented. In the second end position and thus in the released state of the dispenser, the aforementioned edge region is displaced relative to the actuating handle so that the distal end of the actuating handle can be pivoted through the through-passage into the inner region of the outer housing.

A liquid dispenser is proposed according to a second aspect of the invention, said liquid dispenser having in the manner already described a liquid reservoir, a nozzle unit and an actuating handle, in particular for actuating a pump. Preferably, a liquid dispenser according to this second aspect of the invention is configured at the same time according to the first aspect of the invention.

The nozzle unit according to this second aspect of the invention is provided with a nozzle plate with a plurality of nozzle openings which are configured to generate fine spray jets which after exiting break up into individual droplets independently of the influence of air (Rayleigh instability). Preferably, the nozzle plate has to this end at least 10 nozzle openings. The nozzle openings preferably have a clear cross section of a maximum of 250 $\mu m^2$.

In order to generate a sufficient flow of liquid during the discharge of these fine spray jets, a relatively high pressure has to be generated in embodiments with a pump device.

In order to be able to generate this high pressure comfortably, the actuating handle is configured as a pivotably movable actuating handle and has an actuating surface of at least 5 cm in length, preferably of at least 6 or even at least 8 cm in length. Preferably, the spacing from the pivot axis to the distal end of the actuating handle is at least 5 cm in length, preferably at least 6 or at least 8 cm in length.

The user can thus push the actuating handle with two or more fingers when the outer housing has been enclosed by the hand. A high force can be exerted on the pump device over a lengthy time period in a correspondingly simple manner.

Although a different attachment of the actuating handle is also possible in this second aspect of the invention, it is regarded as preferred if the actuating handle is pivotably articulated to an inner housing, the outer housing being able to be displaced relative thereto in a translational manner.

The pump device of a liquid dispenser according to the invention is preferably designed such that a pressure which is suitable for generating a fine aerosol can be produced by the actuating handle over a lengthy time period. In particular, the pump device is configured to convey a quantity of liquid of at least 25 μl per actuation.

Preferably, the pump device is designed and coupled to the actuating handle, and the nozzle unit and a fluid channel from the pump device to the nozzle unit are preferably designed such that, starting from a pump chamber of the pump device completely filled with water and when the actuating handle is actuated with an actuating force of 20 Newtons on the distal end of the actuating handle, a discharge of at least 1 second is brought about, in particular at least 2 seconds. The discharge takes place for the same length of time as an equally long actuation of the actuating handle.

The inner housing of the liquid dispenser can directly encompass the liquid dispenser, which is inseparably installed therein, and all further liquid-guiding surfaces of the dispenser. In particular, an outer wall of the inner housing can represent at the same time the wall of the liquid reservoir.

An alternative provides that the liquid dispenser has a separate discharge assembly which comprises at least the liquid reservoir, the pump device or an outlet valve and a dispensing opening. The discharge assembly preferably already represents a single fully functional dispenser, separately from the other parts of the liquid dispenser. This makes it possible to use an existing dispenser which is not adapted or not substantially adapted thereto. This reduces the structural complexity of the liquid dispenser according to the invention. Such a functional dispenser which is used as a discharge assembly is preferably a so-called "side actuation" dispenser which has an actuating button in the region of a lateral surface and which preferably has a transversely installed pump device.

The discharge assembly is provided to be inserted into the inner housing. This inner housing has to this end a receiving space in which the discharge assembly can be coupled thereto without the use of tools and released again therefrom without the use of tools. The inner housing preferably completely surrounds this receiving space and is open on a lower face so that the discharge assembly can be pushed therein.

The discharge assembly can be held non-positively in the inner housing, for example. On the other hand, however, embodiments are preferred in which the inner housing and the discharge assembly are provided for positive coupling, in particular by means of a bayonet coupling device or a threaded coupling device.

It is preferred if the liquid dispenser has a pump device, preferably a pump device with a pump chamber which is connected via an inlet channel to the liquid reservoir and which is connected via an outlet channel to the nozzle unit, wherein the inlet channel and the outlet channel in each case are provided with an inlet valve or outlet valve which open in the case of a downstream negative pressure. Preferably, the pump chamber can be varied in terms of volume via a piston which can be displaced in a pumping direction or a diaphragm wall. The pumping direction is preferably not oriented parallel to the discharge direction. Preferably, the pumping direction of the pump device is oriented transversely to the discharge direction.

A design of liquid dispenser with a pump device makes it possible to use an unpressurized liquid reservoir. Preferably, the liquid reservoir has a variable internal volume so that a ventilation of the liquid reservoir can be dispensed with. In particular, the liquid reservoir can have a cylindrical wall in which a displaceable trailing piston is arranged. Alternatively, a liquid reservoir with at least one deflectable flexible wall can be used, in particular in the form of a collapsing bag reservoir.

The liquid dispenser can be configured as a whole as a disposable dispenser. Alternatively, it can be provided that at least parts are reused, by the liquid reservoir or the above-described discharge assembly being designed to be replaceable. A further possibility for reusing the dispenser provides that the liquid dispenser has a refill opening which is separate from the nozzle unit. The liquid reservoir can be filled through this refill opening, in particular when it is an unpressurized reservoir. The refill opening is preferably arranged directly in a wall of the liquid reservoir.

In the ready-to-sell state, the liquid reservoir is filled, wherein it is preferably filled with a pharmaceutical liquid or a liquid containing nicotine and/or cannabis depending on the preferred fields of application. In particular, a liquid volume of 50 ml or less, in particular of 10 ml or less, can be contained in the liquid reservoir.

The nozzle unit, which preferably has a nozzle plate and a carrier bearing the nozzle plate, can be configured as a nozzle unit which is replaceable without the use of tools, for example it is able to be connected by means of a bayonet coupling to the main body of the inner housing and released therefrom. A replaceable nozzle unit can be easily removed for the purpose of cleaning and can also serve for customizing the appearance of the liquid dispenser.

BRIEF DESCRIPTION OF THE DRAWINGS

Further advantages and aspects of the invention are found in the claims and in the following description of preferred exemplary embodiments which are described hereinafter with reference to the figures.

FIGS. 1 and 2 show the dispenser in the released state in a perspective view and a sectional view.

FIG. 3 shows the nozzle unit of the dispenser with a surrounding carrier.

FIGS. 4 to 7 illustrate the release of a blocking device of the dispenser and the following transfer of the liquid dispenser from a locked state into a released state.

FIG. 8 illustrates the construction of the liquid dispenser by separate views of its outer housing, its inner housing together with the actuating handle and its discharge assembly.

FIG. 9 shows the combination of the inner housing and outer housing before inserting the discharge assembly.

FIG. 10 shows the insertion of the discharge assembly into the combination of FIG. 9.

DETAILED DESCRIPTION

The designs of FIGS. 1 to 10 and FIGS. 11 to 13 differ from one another by the structural details which are described in more detail below. Unless described differently, the aspects described below apply to both designs. The further structural details which are described with reference to FIGS. 14 to 18 can equally be implemented in the liquid dispensers of FIGS. 1 to 10 or 11 to 13.

Figure 1:
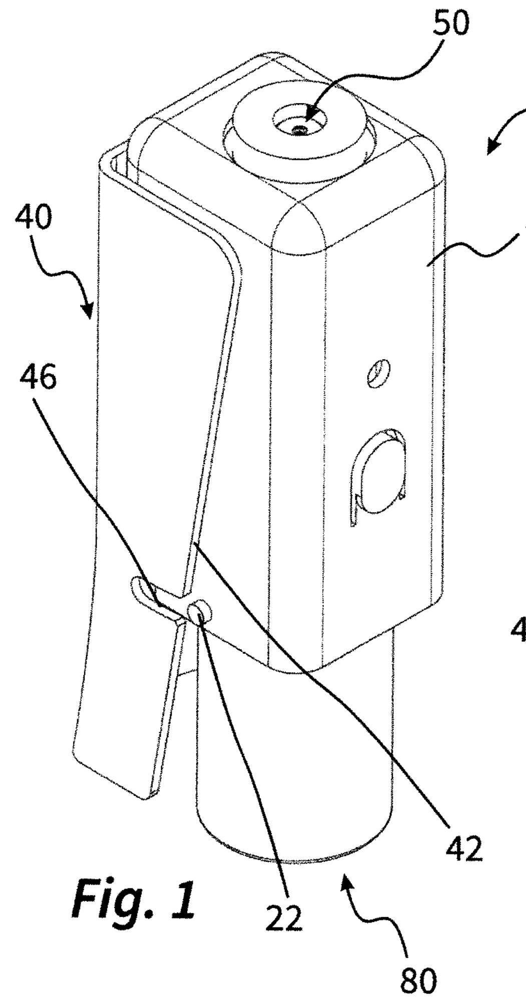
FIGS. 1 to 10 show a first exemplary embodiment of a liquid dispenser according to the invention.
Figure 2:
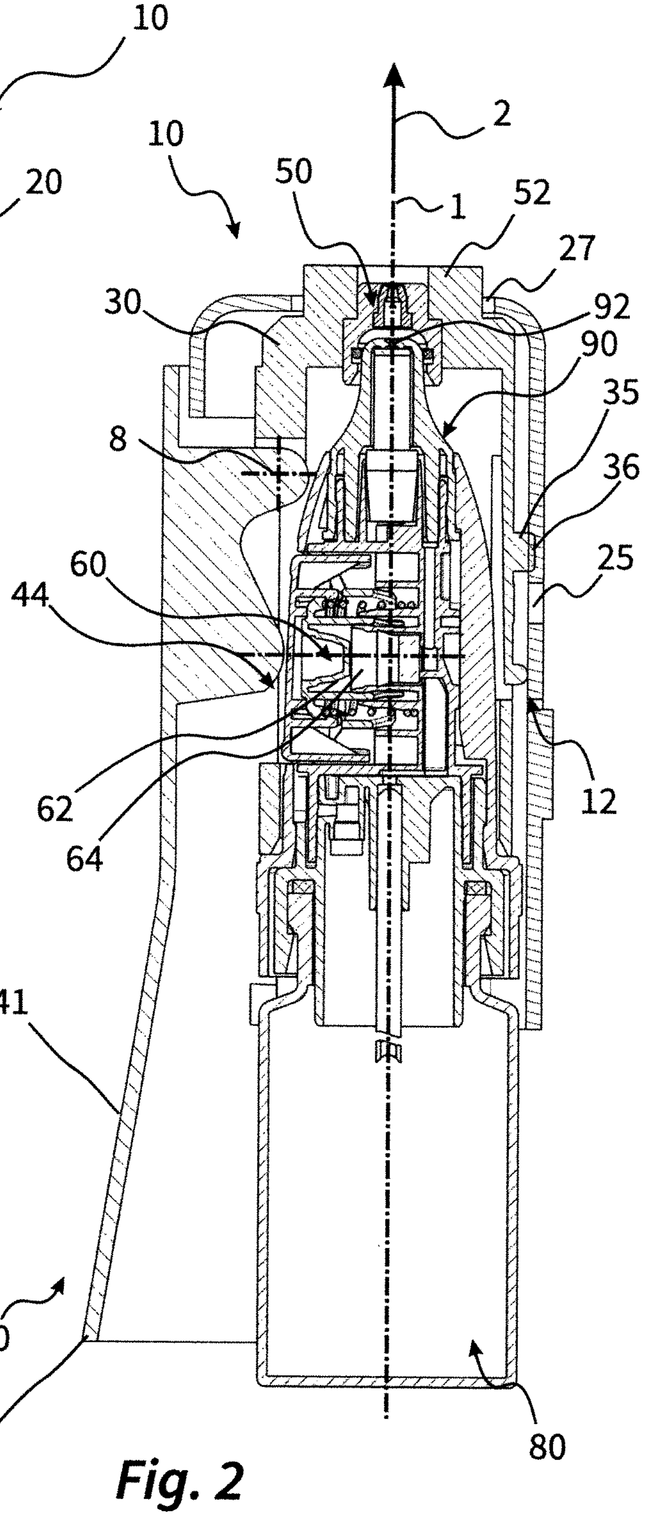

FIGS. 1 and 2 show a liquid dispenser of the type according to the invention in a perspective view and a sectional view. The liquid dispenser 10 has an outer housing 20, an inner housing 30 inserted therein with a discharge assembly 90 contained therein and an actuating handle 40. The liquid dispenser 10 has overall a shape which is oriented longitudinally in the direction of a main axis 1. A nozzle unit 50 through which liquid can be discharged in a discharge direction 2, in particular in finely atomized form, is provided at the end of the liquid dispenser 10 facing upwardly in the figures.

The actuating handle 40 is provided for bringing about a discharge of liquid, the actuating handle being pivotable about a pivot axis 8 which is fixed to the inner housing 30 and which can thereby actuate a pump device 60 in a manner described below, liquid being able to be conveyed out of a liquid reservoir 80 to the nozzle unit 50 by means of the pump device. The pump device 60 in the present exemplary embodiment is configured as a diaphragm piston pump. The pump chamber 62 thereof can be reduced and enlarged by displacing the diaphragm piston 64 at right-angles to the main axis 1. The diaphragm piston 64 has a relatively rigid central part which is connected at the edge to a fixed pump chamber wall via a deformable annular surface.

Figure 3:
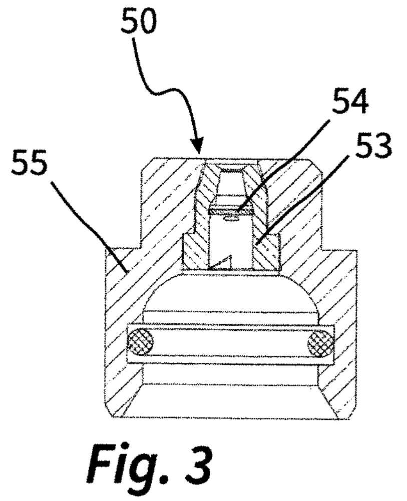

Liquid located in the pump chamber 62 is conveyed when the actuating handle 40 is actuated, and with the resulting displacement of the diaphragm piston 64, and forced through a nozzle plate 54, shown in FIG. 3, of the nozzle unit 50. The nozzle plate 54 has a plurality of fine nozzle openings which can have been incorporated in the nozzle plate by means of a laser, for example. The nozzle plate 54, which is metallic for example, is inserted into a nozzle sleeve 53.

It is desirable, in particular, that the fine liquid jets dispensed through the nozzle plate 54 break up into very fine individual droplets after being dispensed. With a suitable design of the nozzle openings of the nozzle plate 54, the liquid jets are sufficiently fine to ensure so-called Rayleigh instability on the other side of the nozzle plate.

To this end, the nozzle plate has 50 nozzle openings, the clear cross section thereof being in each case 200 $\mu m^2$ at the narrowest point.

The nozzle plate 54 is adapted to the pump device 60, the pressure which can be generated thereby and the quantity of liquid which can be discharged by actuating the pump device 60, such that in the course of a single pump movement, with an actuation of 20 Newtons for a time period of at least one second, liquid can be discharged through the nozzle plate 54 such that the resulting liquid jets break up in the desired manner into individual droplets.

The pivotably movable actuating handle 40 which acts indirectly on the diaphragm piston 64 via a cam 44, permits a long-lasting and very comfortable actuation. This is achieved, in particular, by a large actuating surface 41 being provided. The spacing between the pivot axis 8 of the actuating handle 40 and the distal end 43 thereof is approximately 7 cm in the present case. Since the cam 44 is spaced apart from the pivot axis 8 only by about 2 cm, with an actuating force of 20 Newtons on the distal end 43 of the actuating handle 40, approximately a force of 80 Newtons can be exerted on the diaphragm piston 64.

Figure 8:
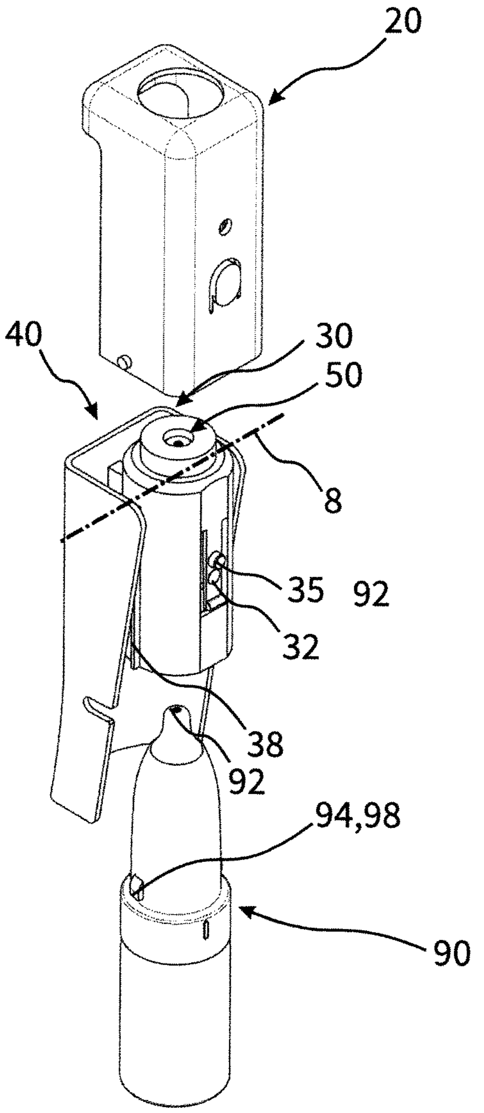
Figure 10:
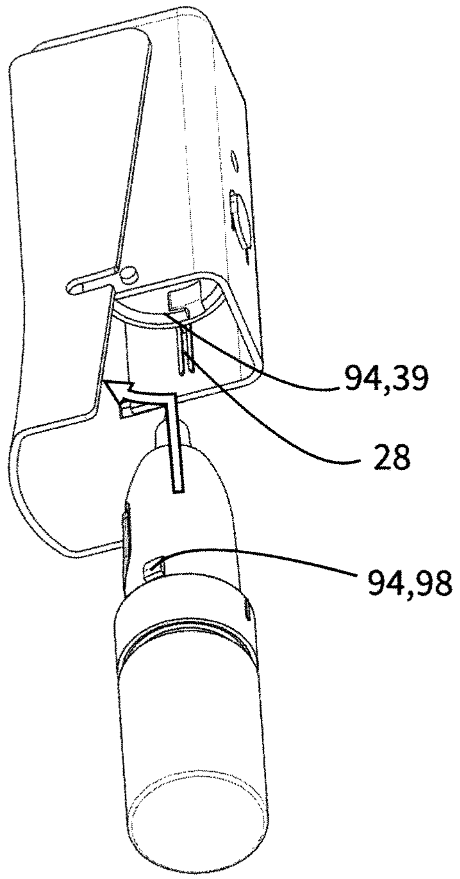

The pump device 60 is part of a discharge assembly 90 which also has the liquid reservoir 80 and a dispensing opening 92. The discharge assembly 90, shown once again separately in FIGS. 8 and 10, is already a functional dispenser for the discharge of liquid which is functionally supplemented by the addition of the inner housing 30, the outer housing 20 and the actuating handle 40.

The nozzle unit 50 is shown in the aforementioned FIG. 3. This nozzle unit is inserted in a carrier 55 which also has on its lower face a receiving space for the distal end of the discharge assembly 90. This means that liquid, which is dispensed from the discharge assembly in the region of the dispensing opening 92, collects in the recess of the carrier 55 which is sealed by means of an O-ring and is dispensed therefrom through the nozzle plate 54 in the form of the aforementioned liquid jets.

Figure 4:
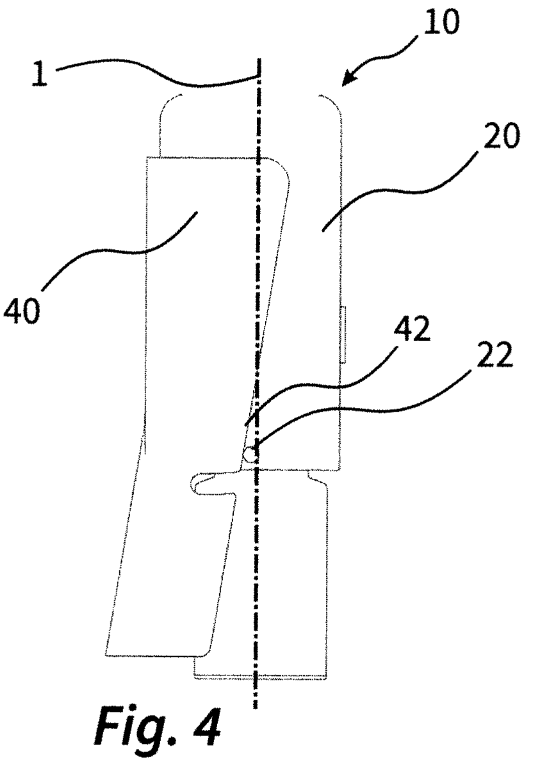
Figure 5:
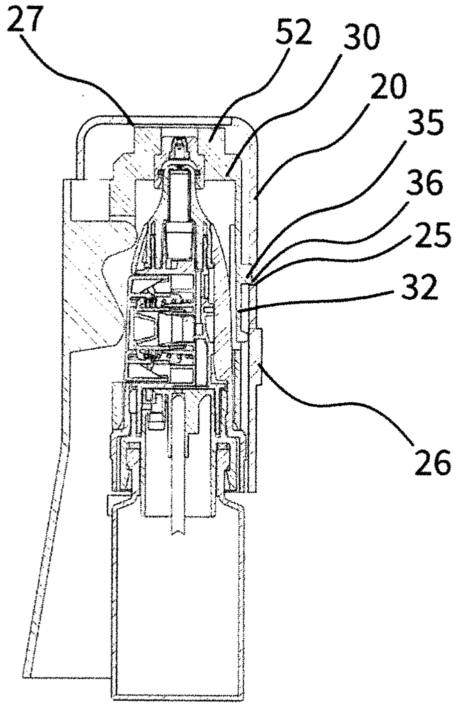
Figure 6:
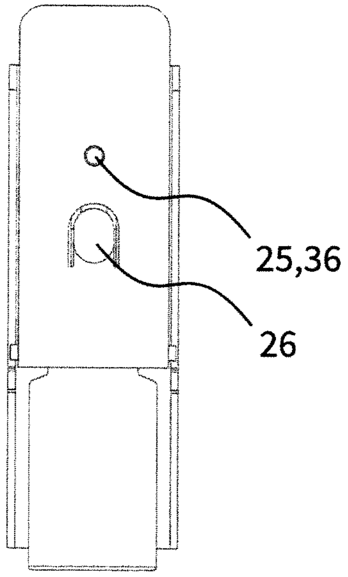

FIGS. 1 and 2 show an unlocked state of the liquid dispenser 10. The liquid dispenser 10, however, can also adopt a locked state, in addition to the unlocked state from which a discharge of liquid is possible. This is shown in FIGS. 4 and 5. In the locked state of FIGS. 4 and 5, the outer housing 20 is displaced upwardly relative to all other components of the liquid dispenser 10, in particular relative to the inner housing 30, the actuating handle 40 and the discharge assembly 90 fastened in the inner housing 30 in the direction of the main axis 1 defined by the main direction of extent. In this state, an actuation of the pump device 60 is not possible since the actuating handle 40 with a locking edge 42 comes into contact with a locking pin 22 when actuated, which prevents a continued actuation of the actuating handle 40. This locked state of FIGS. 4 and 5 is ensured by a blocking body 35 being arranged in a blocking recess 25 of the outer housing 20, said blocking body counteracting an axial displacement of the outer housing 20 relative to the inner housing 30.

Starting from the state of FIGS. 4 and 5, in order to produce the released state of FIGS. 1 and 2, the user has to push on a release button 26. This release button 26 which is an integral part of the outer housing 20, but can be resiliently deflected relative to the surrounding wall regions of the outer housing 20, acts on a similarly resiliently deflectable portion 32 of the inner housing 30, whereby the blocking body 35 is lifted inwardly out of the blocking recess 25 so that then an axial displacement of the outer housing 20 is possible relative to the inner housing 30. If the liquid dispenser 10 is in the locked state, however, an indicator surface 36 which is preferably provided with the signal color red, can be identified from outside through the through-passage 25, so that it can be identified at a glance that the liquid dispenser is currently in the locked state.

Figure 7:
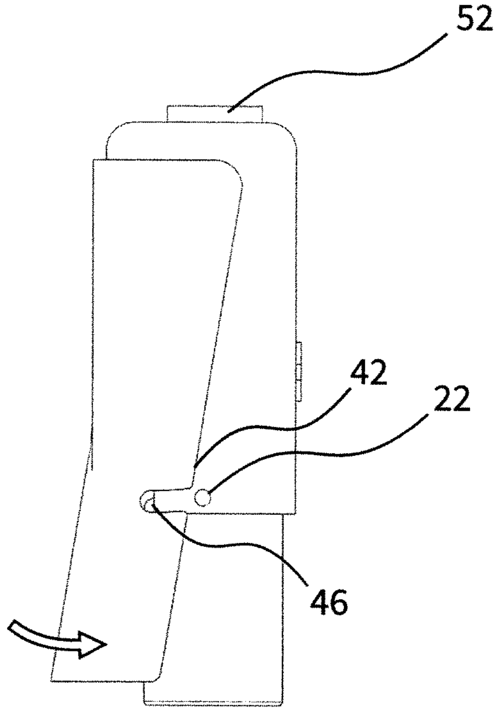

If the released state is produced by pushing in the release button 26 and the subsequent relative displacement of the outer housing 20 relative to the inner housing 30, the actuating handle 40 and the discharge assembly 90, this is shown according to FIG. 7. It can be seen here that the locking edge 42 is now displaced relative to the locking pin 22 so that, when the actuating handle is actuated according to the arrow illustrated in FIG. 7, the locking pin 22 can pass into a free region 46 the actuating handle 40 so that the pump device 60 can be actuated.

As can be clearly identified when comparing FIGS. 7 and 4, the displacement of the outer housing 20 in a translational manner relative to the inner housing 30 in the released state of FIG. 7 also leads to a discharge nozzle 52 of the inner housing 30 surrounding the nozzle unit 50 being pushed outwardly through a corresponding opening 27 of the outer housing 20. In the locked state of FIG. 4, however, the discharge nozzle, and therewith the nozzle unit 50 inserted therein, are arranged fully inside the outer housing 20 and thereby protected from mechanical damage.

FIG. 8 shows once again the liquid dispenser 10 divided up into sub-components. It is possible to identify the discharge assembly 90 which is supplemented by the inner housing 30 and the outer housing 20 to form a liquid dispenser according to the invention, but also comprises a functional dispenser without these further elements 20, 30, 40. The inner housing 30 with the actuating handle 40 which is pivotable thereon about the pivot axis 8 can also be identified here. As can be seen here, the inner housing 30 has in principle a sleeve-like structure. The resiliently deflectable blocking body 35 is provided on the side facing to the front in FIG. 8. It can also be identified that guide projections 38 which cooperate with grooves 28, shown in FIG. 10, are provided to the side on the inner housing 30, in order to permit the translationally guided mobility of the outer housing 20 relative to the inner housing 30 and the actuating handle 40.

Figure 9:
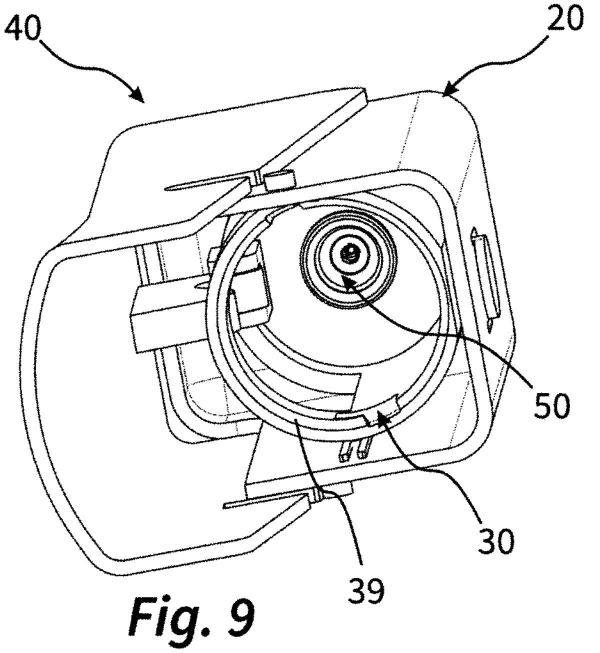

FIG. 9 shows the combination of the inner housing 30, the outer housing 20 and the actuating handle 40. It can be seen that the inner housing 30 has a bayonet groove 39, which permits a coupling with corresponding bayonet cams 98 in the manner illustrated in FIG. 10, by inserting and rotating the discharge assembly 90.

Figure 11:
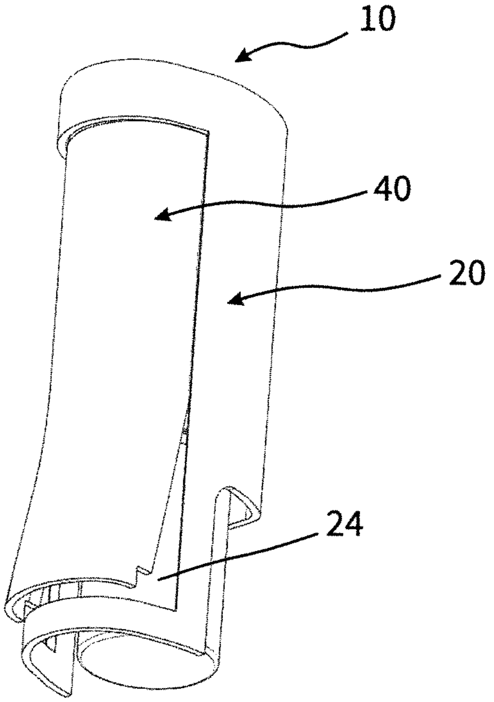
FIGS. 11 to 13 show a second exemplary embodiment of a liquid dispenser according to the invention with a different design of the lock for preventing the discharge of liquid in the locked state of the dispenser.
Figure 12:
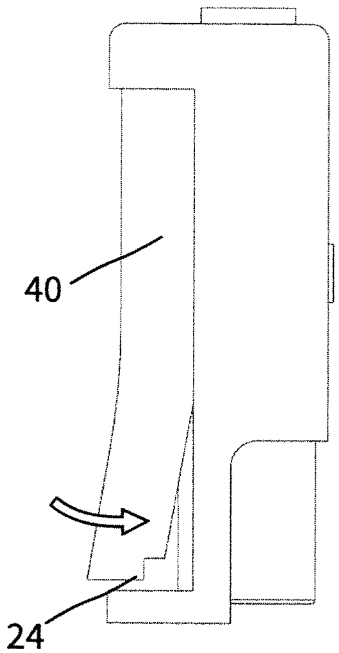
Figure 13:
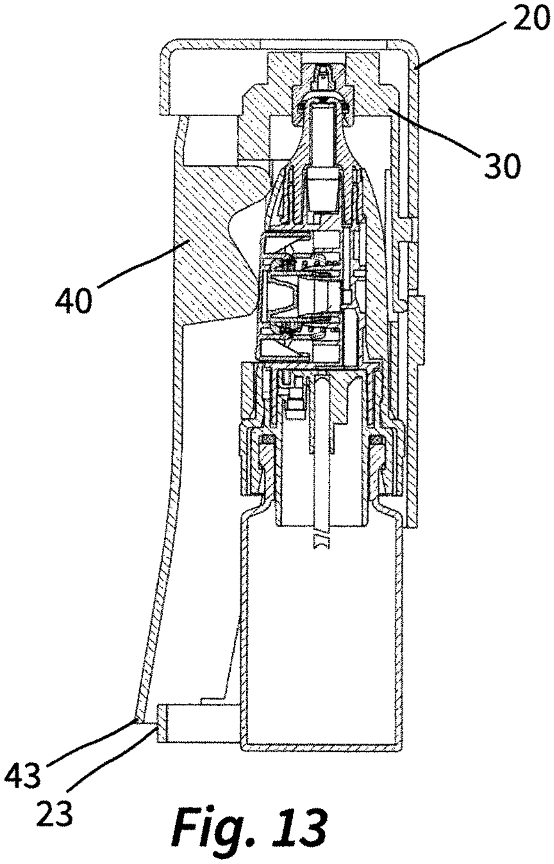

In the design according to FIGS. 11 to 13, relative to the design of FIGS. 1 to 10, only one essential change in the context of the invention has to be noted. This consists in that the actuating handle 40 is not fully arranged on the outer face of the outer housing 20, but protrudes through a through-passage 24 of the outer housing 20 into said outer housing. The actuating handle 40, however, extends at least with its distal end 43 right through the through-passage 24. FIGS. 11 and 12 show the released state of the liquid dispenser 10. Starting from this state, the actuating handle 40 can be pivoted about the pivot axis 8, wherein a discharge process is brought about thereby.

If, however, the outer housing 20 is displaced upwardly for producing the locked, and preferably also the blocked, state relative to the inner housing 30 and the actuating handle 40, the state of FIG. 13 is produced. In this state, a lower edge region 23 of the outer body 20 engages below the actuating handle 40 in the region of its distal end 43. As can be clearly seen from FIG. 13, a pivotability of the actuating handle 40 is significantly limited thereby. In this locked state, the actuating handle 40 can no longer be pivoted sufficiently far to bring about a discharge process.

The liquid reservoirs 80, which are shown in FIGS. 1 to 13, are configured in the form of single-walled rigid liquid reservoirs which have ventilation, so that after the liquid has exited, air can flow in from the surroundings for the purpose of pressure compensation.

Figure 14:
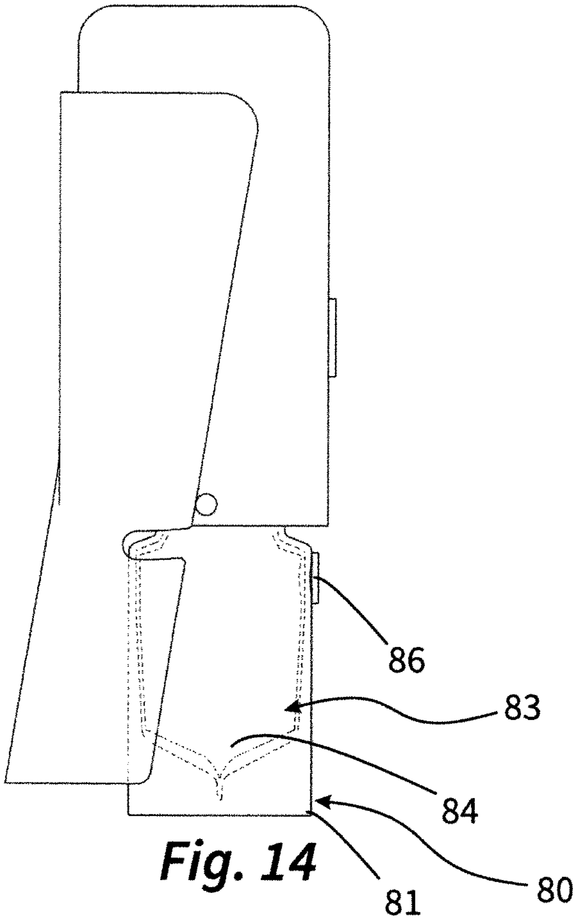
FIGS. 14 and 15 show a variant of the liquid reservoir of the liquid dispenser in a design as a liquid bag.
Figure 15:
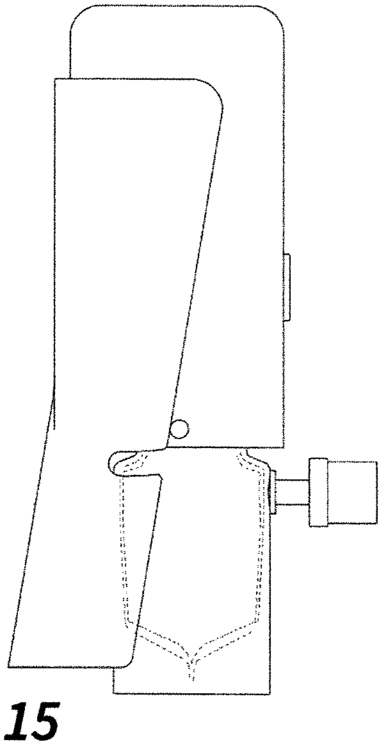
Figure 16:
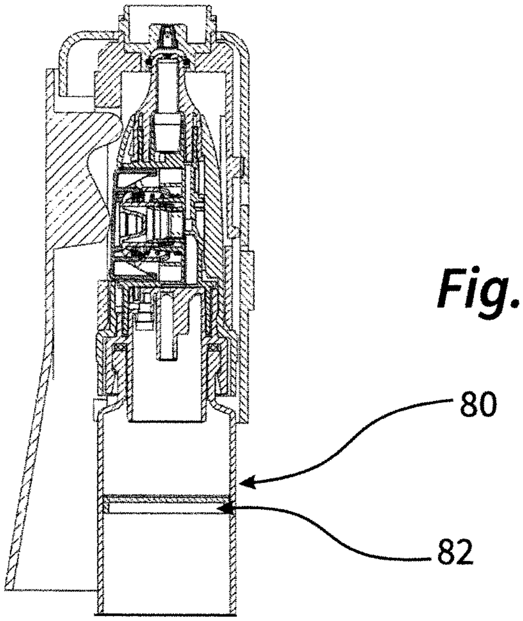
FIG. 16 shows a variant of the liquid reservoir of the liquid dispenser with a trailing piston.

In contrast, the liquid reservoir designs which are shown in FIGS. 14 to 16 are preferred. In the design according to FIGS. 14 and 15, the liquid reservoir 80 is provided with a rigid outer sleeve 81, a liquid bag 83 being arranged therein. This liquid bag is formed by flexible walls 84 so that, during the course of the discharge of liquid, it can be reduced without a permanent negative pressure being produced in the liquid reservoir 80. In the specific design of FIGS. 14 and 15, a refill opening 86 is provided, further liquid from a refill dispenser, such as for example a pressure accumulator, being able to be forced into the liquid reservoir 80 through said refill opening.

The embodiment of FIG. 16 is designed as a trailing piston system. This means that an axially displaceable trailing piston 82 is provided here inside the cylindrical liquid reservoir 80, the trailing piston being pulled upwardly during the course of the continued discharge of liquid, so that once again no ventilation is required and a permanent negative pressure in the liquid reservoir is nevertheless avoided.

Figure 17:
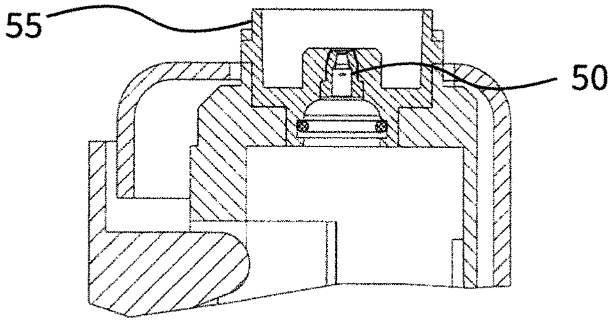
FIGS. 17 and 18 show a variant of the liquid dispenser in which the nozzle unit is designed to be replaceable without the use of tools.
Figure 18:
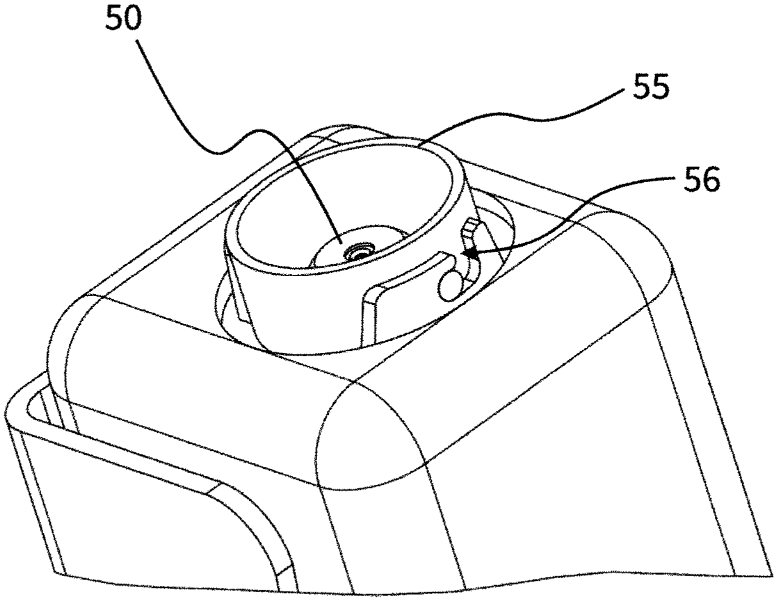

FIGS. 17 and 18 show a particular embodiment of the attachment of the nozzle unit 50. In the case of the design of FIGS. 17 and 18, the nozzle unit 50 is not fixed inside a carrier which is permanently connected to the inner housing 30, but in a replaceable carrier 55 which is coupled to a discharge nozzle 52 of the inner housing 30 by a simple releasable connection, in particular a bayonet coupling 56. In this manner, the unit comprising the replaceable carrier 55 can be adapted to the wishes of the user in terms of technology and appearance. Moreover, the nozzle unit 50 can be cleaned in a simple manner by such a simple replacement mechanism.

The invention claimed is:

1. A liquid dispenser for discharging a pharmaceutical liquid or a liquid containing nicotine or cannabis, the liquid dispenser comprising:

a liquid reservoir for storing the liquid prior to discharge;

a nozzle unit through which liquid is dischargeable in a discharge direction;

an actuating handle actuable in a direction that deviates from the discharge direction to convey liquid from the liquid reservoir to the nozzle unit;

an inner housing, the actuating handle being pivotably articulated to the inner housing; and an outer housing displaceable in a translational manner relative to the inner housing between a first end position and a second end position, the actuating handle and the outer housing having cooperating locking portions, the locking portions preventing actuation of the actuating handle in the first end position and allowing an actuation of the actuating handle in the second end position.

2. The liquid dispenser as claimed in claim 1, wherein the outer housing and the inner housing, or sub-elements of the outer housing and the inner housing, are non-detachably connected to one another.

3. The liquid dispenser as claimed in claim 1, further comprising a blocking device blocking displacement of the outer housing relative to the inner housing.

4. The liquid dispenser as claimed in claim 1, wherein the nozzle unit is arranged fixedly relative to the inner housing.

5. The liquid dispenser as claimed in claim 4, wherein the nozzle unit and/or a discharge nozzle surrounding the nozzle unit is arranged such that the nozzle unit and/or the discharge nozzle is arranged inside the outer housing in the first end position and is displaced outwardly through an opening of the outer housing in the second end position.

6. The liquid dispenser as claimed in claim 1, wherein the outer housing has at least one locking contour extending outwardly or inwardly, and the actuating handle has at least one locking edge facing in the direction of the at least one locking contour, a free region of the at least one locking edge being arranged adjacent to the at least one locking contour, such that in the first end position when the actuating handle is actuated, the locking edge collides with the locking contour, and in the second end position when the actuating handle is actuated, the locking contour passes into the free region.

7. The liquid dispenser as claimed in claim 1, wherein the outer housing has a through-passage, the actuating handle extending outwardly through the through-passage from an inner region of the outer housing, and the actuating handle is adapted to the through-passage such that in the first end position a distal end of the actuating handle strikes against an edge region of the through-passage when actuated, and in the second end position the distal end of the actuating handle is pivotable through the through-passage into the inner region of the outer housing.

8. A liquid dispenser for discharging a pharmaceutical liquid or a liquid containing nicotine or cannabis, the liquid dispenser comprising:

a liquid reservoir for storing the liquid prior to discharge;

a nozzle unit through which liquid is dischargeable in a discharge direction; and an actuating handle actuable in a direction that deviates from the discharge direction to convey liquid from the liquid reservoir to the nozzle unit, wherein the nozzle unit has a nozzle plate including a plurality of nozzle openings configured to generate a spray jet without the influence of air (Rayleigh instability), and the actuating handle is configured as a pivotably movable actuating handle and has an actuating surface of at least 5 cm in length.

9. The liquid dispenser as claimed in claim 8, further comprising an inner housing, the actuating handle being pivotably articulated to the inner housing.

10. The liquid dispenser as claimed in claim 8, wherein the liquid dispenser has an inner housing, the actuating handle being pivotably articulated to the inner housing, and an outer housing displaceable in a translational manner relative to the inner housing between a first end position and a second end position, the actuating handle and the outer housing have cooperating locking portions, the locking portions preventing actuation of the actuating handle in the first end position and allowing actuation of the actuating handle in the second end position.

11. The liquid dispenser as claimed in claim 1, further comprising a pump device operable by the actuating handle.

12. The liquid dispenser as claimed in claim 11, wherein the pump device is coupled to the actuating handle, and the nozzle unit and a fluid channel from the pump device to the nozzle unit are configured such that, starting from a pump chamber of the pump device completely filled with liquid and when the actuating handle is actuated with an actuating force of 20 Newtons, a discharge having a duration of at least one second occurs.

13. The liquid dispenser as claimed in claim 11, further comprising a discharge assembly comprising at least the liquid reservoir, the pump device or an outlet valve and a dispensing opening, and the inner housing has a receiving space for receiving the discharge assembly by coupling without the use of tools.

14. The liquid dispenser as claimed in claim 1, wherein the liquid reservoir is configured as an unpressurized liquid reservoir.

15. The liquid dispenser as claimed in claim 14, wherein the liquid reservoir is configured as a liquid reservoir with variable internal volume and includes a trailing piston reservoir with a trailing piston or the liquid reservoir is configured as a bag reservoir with at least one deflectable flexible wall.

16. The liquid dispenser as claimed in claim 14, further comprising a refill opening separate from the nozzle unit, the refill opening being arranged directly in a wall of the liquid reservoir.

17. The liquid dispenser as claimed in claim 1, wherein the nozzle unit is configured for being replaced without the use of tools.

18. The liquid dispenser as claimed in claim 1, wherein the liquid reservoir is filled with a pharmaceutical liquid or a liquid containing nicotine and/or cannabis.

19. The liquid dispenser as claimed in claim 1, further comprising one of the following:

the liquid reservoir has an internal volume of 50 ml or less; and/or the liquid dispenser comprises a pump device, the pump device being configured for discharging a liquid quantity of at least 25 μl per actuation and less than 200 μl per actuation; and/or a distal end of the actuating handle is spaced apart from a pivot axis of the actuating handle by at least 5 cm.

20. The liquid dispenser as claimed in claim 3, the liquid dispenser further comprising at least one of the following:

a resiliently deflectable blocking body disposed on the inner housing or on the outer housing, said blocking body being arranged in a position in which the blocking body is not deflected and located in a blocking recess of the outer housing or the inner housing, and thereby bringing about the blocking, and said blocking body being able to be deflected by at least one release button such that the blocking body is pushed out of the blocking recess; and/or a through-passage disposed in the outer housing, an indicator surface of the inner housing being viewable from the outside when the inner housing and the outer housing are in the first or the second end position, the through-passage of the outer housing comprising the blocking recess.

21. The liquid dispenser as claimed in claim 13, further including at least one of the following:

the inner housing and the discharge assembly have a bayonet coupling device; and/or the inner housing and the discharge assembly have a clamping coupling device or a threaded coupling device.

22. The liquid dispenser as claimed in claim 17, further comprising a bayonet coupling, the nozzle unit being connected by the bayonet coupling to the inner housing of the liquid dispenser.

23. The liquid dispenser as claimed in claim 1, wherein the outer housing remains attached to the inner housing in both the first and second end positions.

24. The liquid dispenser as claimed in claim 1, wherein the outer housing and the inner housing are non-detachably connected to one another during operation of the liquid dispenser.

* * * * *